(12) United States Patent
Hooker et al.

(10) Patent No.: US 7,043,577 B2
(45) Date of Patent: May 9, 2006

(54) AUTO-DETECTING UNIVERSAL APPLIANCE COMMUNICATION CONTROLLER

(75) Inventors: John Kenneth Hooker, Louisville, KY (US); Eric Larouche, Charlesbourg (CA)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 10/228,486

(22) Filed: Aug. 27, 2002

(65) Prior Publication Data

US 2004/0044816 A1 Mar. 4, 2004

(51) Int. Cl.
*G06F 13/42* (2006.01)

(52) U.S. Cl. .......................... 710/105; 710/305; 710/8; 710/10; 710/104; 713/1; 713/2; 713/100; 340/3.5

(58) Field of Classification Search ................ 710/305, 710/8, 10, 104; 713/1, 2, 100; 340/3.5, 340/3.51
See application file for complete search history.

(56) References Cited

U.S. PATENT DOCUMENTS

| | | | |
|---|---|---|---|
| 4,556,866 A | 12/1985 | Gorecki | |
| 4,749,992 A | 6/1988 | Fitzemeyer et al. | |
| 4,899,129 A | 2/1990 | MacFadyen et al. | |
| 4,899,217 A | 2/1990 | MacFadyen et al. | |
| 5,101,191 A | 3/1992 | MacFadyen et al. | |
| 5,268,666 A * | 12/1993 | Michel et al. | 340/310.06 |
| 5,404,137 A * | 4/1995 | Levien | 340/3.9 |
| 5,420,577 A * | 5/1995 | Kim et al. | 340/825.52 |
| 5,557,634 A | 9/1996 | Balasubramanian et al. | |
| 5,572,438 A | 11/1996 | Ehlers et al. | |
| 5,684,710 A | 11/1997 | Ehlers et al. | |
| 5,701,411 A * | 12/1997 | Tran et al. | 709/250 |
| 5,860,028 A * | 1/1999 | Pecore | 710/41 |
| 6,211,796 B1 | 4/2001 | Toms et al. | |
| 6,239,722 B1 * | 5/2001 | Colton et al. | 340/870.02 |
| 6,400,281 B1 * | 6/2002 | Darby et al. | 340/933 |
| 6,528,957 B1 | 3/2003 | Luchaco | |
| 6,686,838 B1 * | 2/2004 | Rezvani et al. | 340/506 |
| 2002/0027504 A1 * | 3/2002 | Davis et al. | 340/540 |
| 2002/0073254 A1 * | 6/2002 | Bertsch | 710/100 |
| 2003/0109938 A1 * | 6/2003 | Daum et al. | 700/11 |

OTHER PUBLICATIONS

Dhir, Amit, et al., "Programmable Logic Enables HAVi and IEEE 1394 Products," Sep. 2001, ECN, vol. 45, Iss. 10, p. 63, 64, and 66.*

Ogawa, Mitsushiro, et al., Long Term Remote Behavioral Monitoring of Elderly by Using Sensors Installed in Ordinary Houses May 2-4, 2002, 2nd Annual Int'l IEEE-EMB Special Topic Conference on Microtechnologies in Medicine & Biology, p. 322-325.*

* cited by examiner

*Primary Examiner*—Rehana Perveen
*Assistant Examiner*—Donna K. Mason
(74) *Attorney, Agent, or Firm*—H. Neil Houser, Esq.; Armstrong Teasdale LLP

(57) ABSTRACT

Apparatus and methods for communicating a communications controller with a connected device over a serial bus is provided. The connected device is connected to the bus at one of a plurality of addresses, and the method includes sending a first request to the device over the bus at a first address; waiting for an acknowledgement of the first request by the device; and establishing communication with the connected device if the acknowledgement of the first request is received.

17 Claims, 4 Drawing Sheets

US 7,043,577 B2

AUTO-DETECTING UNIVERSAL APPLIANCE COMMUNICATION CONTROLLER

BACKGROUND OF THE INVENTION

This invention relates generally to control methods and apparatus for appliances, and, more particularly, to a universal communications controller for interfacing and networking different appliance platforms.

Modern appliances typically include a number of relatively sophisticated electronic controls to implement advanced product features and to control components of the appliance to meet increasingly demanding energy efficiency requirements and performance objectives.

In typical appliance operation, a number of peripheral devices are interfaced with a main controller of the appliance, and connecting and communicating the peripheral devices to one another and to the main controller is challenging. For example, in a refrigerator, a main controller board may be interfaced with an icemaker, a dispenser system, distributed temperature control displays and human machine interface (HMI) boards, quick chill compartment systems, and the associated fans, motors, and active components of the refrigerator sealed system that force cold air throughout the refrigerator. Each of these peripheral devices may include a separate control board responsive to commands from the main controller. For example, a dispenser board may activate or deactivate water valves, ice delivery components and ice crushers, dispenser lights and indicators, etc. in response to user interaction and/or interactive commands from the main controller, and the fan motors may include control boards for precise control of airflow in the refrigerator, such as by pulse width modulation and the like. Point-to-point wiring of each of these devices can quickly become unmanageable and expensive.

In addition, appliance main and possibly some of the peripheral control boards often include microcontrollers or microprocessors that allow the appliance to be programmed, reprogrammed, or to execute diagnostic tests. The appliance controls are typically customized for a particular appliance, and conventionally the only means of updating the controls was to replace the appliance. Additionally, service and repair operations conventionally require a visit by qualified personnel to the location of the appliance.

Recent networking technologies provide an opportunity to modify, update, reprogram or alter control data and algorithms, to perform diagnostic tests, and to control appliances from remote locations. Thus, for example, an oven may be preheated or a dishwasher started by an online user before leaving the workplace to return home, and service personnel may diagnose and possibly rectify appliance problems through a network connection. To accomplish these and other considerations, meaningful data exchange across networked appliances is required. Given the large number of appliances employing different control boards utilizing different types of data, meaningful data exchange between the control boards and an external network across appliance platforms has yet to be achieved.

BRIEF DESCRIPTION OF THE INVENTION

In one aspect, a method for communicating a communications controller with a connected device over a serial bus, is provided. The connected device is connected to the bus at one of a plurality of addresses, and the method comprises sending a first request to the device over the bus at a first address; waiting for an acknowledgement of the first request by the device, and establishing communication with the connected device if the acknowledgement of the first request is received.

In another aspect, a method for communicating an appliance communications controller with at least one connected device over a serial communications link is provided. The connected device is connected to the link at one of a plurality of devices addresses according to a communications protocol. The method comprises sending a request to the device over at a current one of the plurality of addresses of the communications protocol; waiting for an acknowledgement of the sent request by the device; establishing communication with the device at the current address if the acknowledgement of the sent request is received; and if the acknowledgment is not received, selecting a new current address in communications protocol and sending a request to the device at the new current address.

In another aspect, a method for communicating an appliance communications controller with at least one device connected to the communications controller over a serial communications link distributed within an appliance is provided. The at least one connected device is connected to the serial communications link at one of a plurality of predetermined device addresses according to a communications protocol, and the application controller includes a memory having the predetermined device addresses therein. The method comprises repeatedly sending a request to the device over at successive addresses of the communications protocol; waiting for an acknowledgement of the sent request by the device after sending each of said repeated requests; and when any of the requests are acknowledged by the connected device, establishing communication with the device at the address where the acknowledgement is received.

In another aspect, an appliance communications controller is provided. The controller comprises a processor configured for connection to an external device; and a memory coupled to said processor, said memory comprising a plurality of addresses for communication with the external device. The processor is configured to determine which of said addresses are associated with the external device and to communicate with the external device.

In another aspect, an appliance communications controller for establishing communication to an external device over a network carrier is provided. The communications controller comprises a power line carrier transceiver, a processor coupled to said power line carrier receiver; and a memory coupled to said processor. The processor is programmed to select one of a plurality of addresses for communication with the external device from said memory, send a request to the selected address; and if an acknowledgment of the request is received, to communicate with the external device in accordance with a predetermined communications protocol.

In another aspect, an appliance communications control system is provided. The system comprises at least one appliance comprising a distributed serial communications link and at least one device connected thereto, said device configured to send and receive data communications; and a communications controller operatively coupled to said serial communications link and configured to send and receive data communications with said device according to a communications protocol. The communications controller comprises a network carrier transceiver, a processor coupled to said network carrier transceiver, and a memory coupled to said processor and comprising address information associated with connection of the at least one appliance device. The processor is programmed to detect connection of said at least one appliance device by successively sending a communications request to each of a plurality of addresses supported by said memory and accepting a reply by the at least one communication device when a communications request is sent to the address where said at least one device is connected.

DETAILED DESCRIPTION OF THE INVENTION

Figure 1:
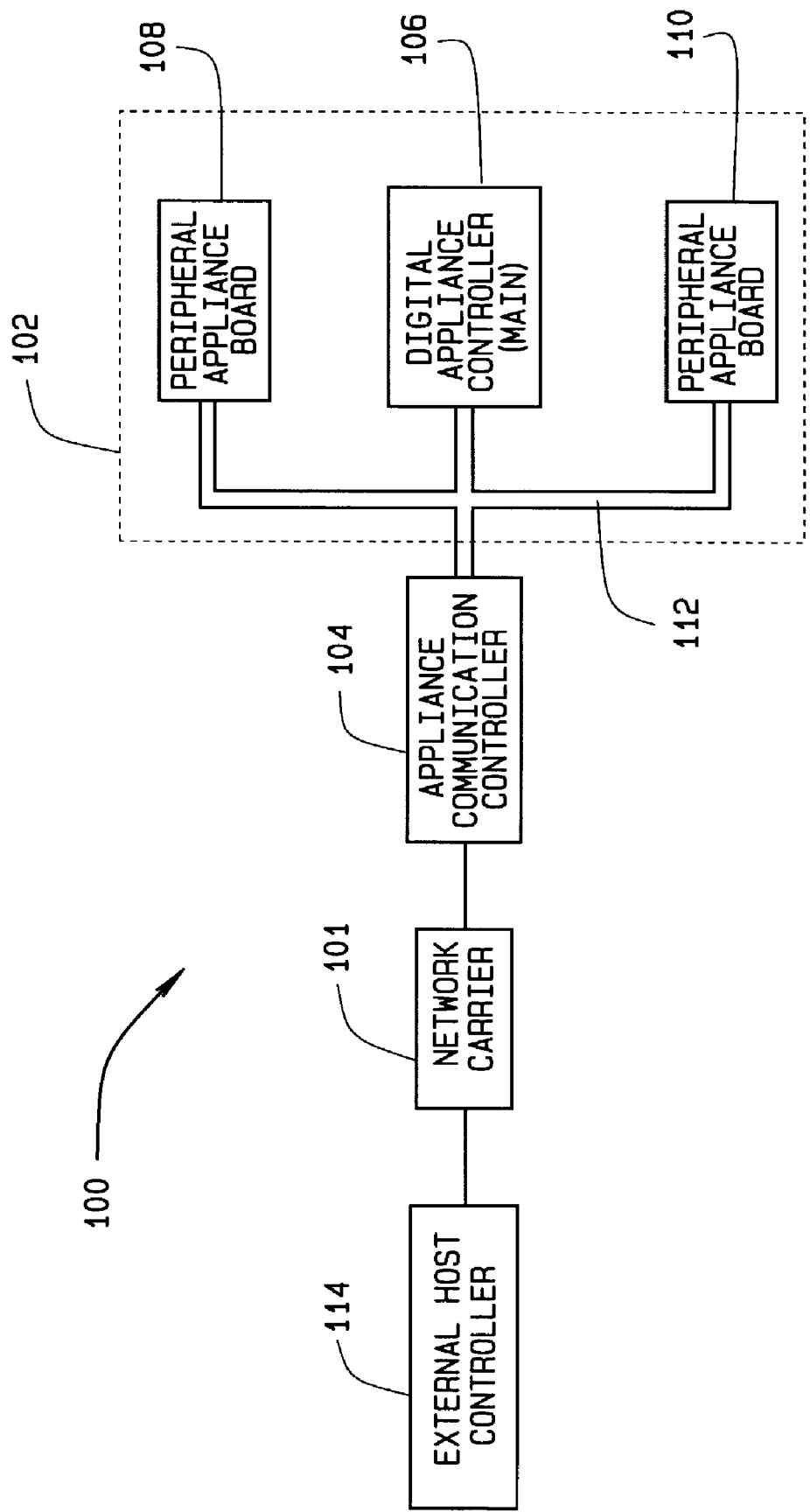
FIG. 1 is a schematic block diagram of an appliance communication system including a universal appliance communication controller.

FIG. 1 illustrates an appliance communication system 100 for interfacing a network carrier 101 to an appliance 102 through an appliance communication controller 104 that provides for bi-directional transmission of data between network carrier 101 and a digital appliance controller 106 of appliance 102. Appliance 102, in various exemplary embodiments, may be a refrigerator, a microwave oven, a convection oven, a stove, a clothes washer, a dryer, a dishwasher, a heating and cooling system appliance, and the like. Appliance 102 includes a main controller 106 communicating with peripheral control boards 108, 110 of peripheral devices through a serial communications bus 112 that facilitates interprocessor communication among the various control boards while simplifying connections between the control boards. Specifically, point-to-point wiring between the main controller and the peripheral devices is rendered unnecessary as each of control boards 106, 108, 110 need only be attached to bus 112 that is extended throughout necessary portions of appliance 102 for control connections. Appliance 102 may therefore be effectively controlled with a reduced numbers of electrical connections.

While appliance 102 is illustrated with two peripheral control boards 108, 110, it is recognized that greater or fewer peripheral control boards may be employed with main controller 106 to operate appliance 102. Therefore, the illustrated control boards 108, 110 are set forth for illustrative purposes only and are not intended to limit the invention to any particular number of control boards. Particulars regarding control boards 106, 108, 110 are believed to within the purview of those in the art and generally beyond the scope of the present invention, so further discussion thereof is omitted.

In an exemplary embodiment, a three wire serial bus 112 having one signal wire and two power/ground wires is, for example, molded or otherwise arranged within a cabinet of appliance 102 to connect the appliance electronics and peripheral devices. Appliance main controller board 106 is coupled to serial bus 112, thereby facilitating communication with peripheral boards 108, 110 and with sensors and transducers (not shown) at all locations where sensory data is required for control of appliance 102, as well as communication with a distributed human-machine interface system including, for example, one or more visual displays (not shown), and one or more input selectors (not shown) for operator manipulation to enter appliance setpoints, activate appliance features, etc. It is contemplated that a serial bus having greater or fewer than three wires may be employed within the scope of the present invention.

Appliance communication controller 104, sometimes referred to as an "ACC", facilitates communication between multiple control boards within an appliance, such as appliance 102, as well as interfaces the appliance with an external network for remote manipulation and data transfer. Control data and algorithms may therefore be revised, updated, modified, or replaced as desired over a network without inconveniencing the appliance owner for a service call and without requiring physical contact with appliance 102. A unique addressing scheme and a control algorithm described below allows appliance communication controller 104 to automatically detect appliances to which it is attached and configure itself for control of that particular appliance. As such, appliance communication controller 104 may be universally used with a wide range of appliances, and application specific controllers and inventories are avoided, thereby simplifying the control scheme.

Data exchange between devices connected to bus 112 is accomplished by a digital serial signal such as via a one, two, or multi wire serial signal link. Each device has a unique digital address allowing appliance main controller 106 to query a status and request information from peripheral devices 108, 110 within appliance 102, and allowing appliances communication controller 104 to query a status, request and transmit information to appliance main controller 106. In operation, each peripheral control board 108, 110 is selectable by appliance controller 106, and appliance controller 106 is selectable by appliance communications controller 104 through respective unique addresses. The address for each control board 106, 108, 110 is part of the connection scheme in distributed bus 112.

Through an external host controller 114, control algorithms and data may transferred to and from main controller 106 of appliance 102. In various embodiments, external host controller 114 is a personal computer, a laptop computer, a remote control operating center, a dedicated service tool, or the like that a remote operator may employ to transmit and receive appliance control data through appliance communication controller 104. Appliance communication controller 104 translates network carrier protocol of carrier 101 and a serial bus protocol, described below, to allow communication between external host controller 114 and main appliance controller 106.

In an exemplary embodiment, network carrier 101 is a power line carrier (PLC) utilizing 120V or 240V AC power lines as a carrier for networking data by modulating the data on a high frequency carrier. Recent PLC technologies, such as CEBus® products in accordance with a CEBus® industry standard developed around a Common Application Language (see EIA standard 721), LonWorks of the Echelon Corporation of San Jose, Calif., and an IT800 Power Line Carrier Transceiver from Itran Communications, Ltd. of Naples, Fla. are commercially available to facilitate adequate data transmission. It is contemplated, however, that other connective mediums, including but not limited to hard wired connections (e.g., RS-232 and Ethernet connections) and wireless technology may also be employed in alternative embodiments while still achieving at least some of the benefits of the instant invention.

In the illustrative embodiment, data is transmitted over a power line by modulating the data on a high frequency carrier above the power line carrier. In one embodiment, the modulated data is a sinusoid wave that is transmitted along with AC power through the power line and associated power lines. The high frequency carrier in one embodiment is between 100 and 400 Hz to keep it below the range of FCC regulation. Such a high frequency carrier may be implemented as an X10 module commercially available from X10 Wireless Technology, Inc. of Seattle, Wash. or as a CEBus power line communication module commercially available from Domosys Corporation of Quebec City, Canada, or the aforementioned IT800 Power Line Carrier Transceiver from Itran Communications, Ltd. of Naples, Fla.

While one appliance 102 is illustrated in FIG. 1, it is appreciated that appliance communication controller 104 may be coupled to more than one appliance 102 for communication of multiple appliances with a remote operator via external host controller 114 and network carrier 101.

Figure 2:
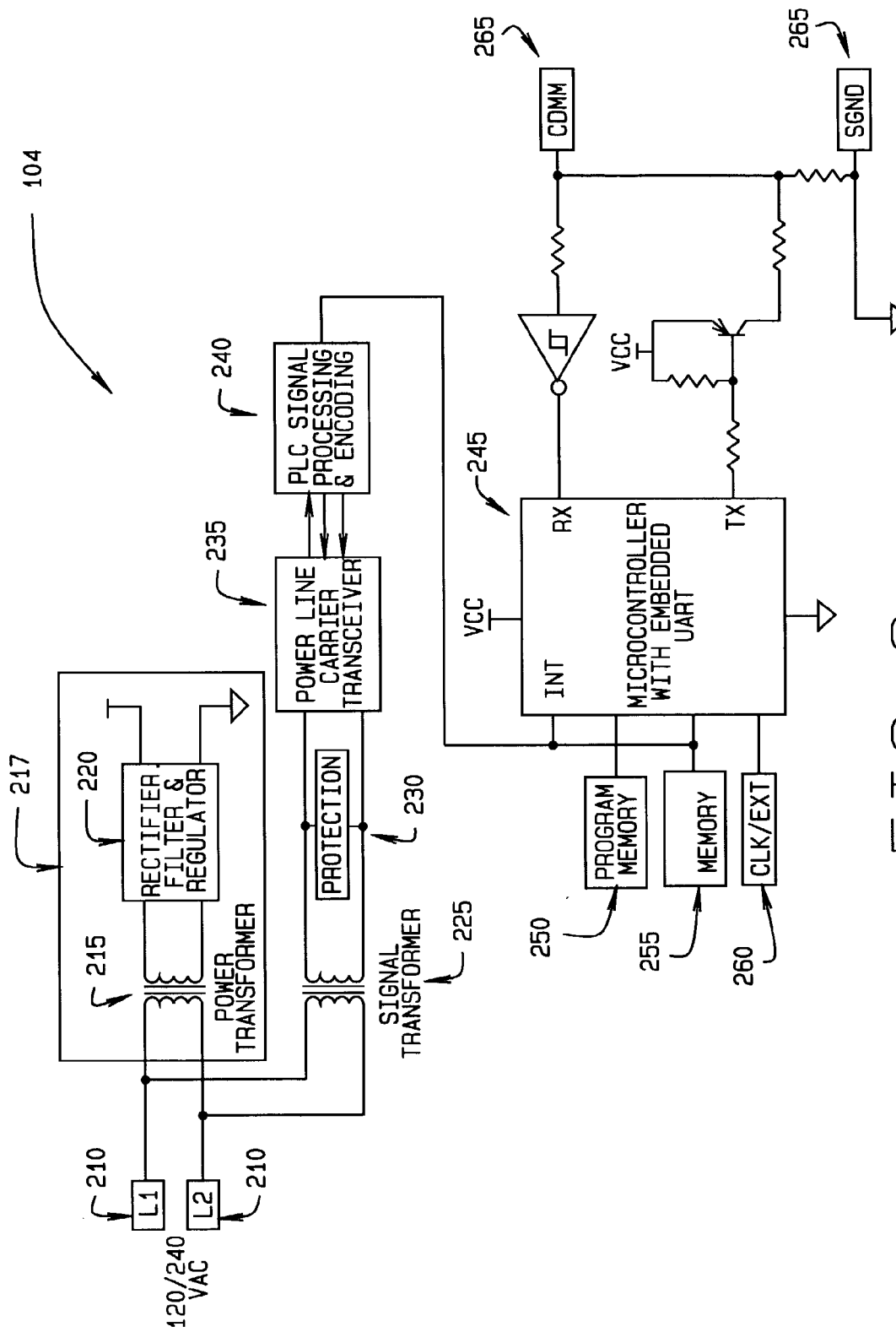
FIG. 2 is a hardware schematic of the appliance communication controller shown in FIG. 1.

FIG. 2 is a hardware schematic of an exemplary appliance communication controller 104 including two connections 210 for 120V of 240V AC power lines, and a transformer based power supply 217. Power supply 217 includes a transformer 215 and a rectifier, filter, and regulator 220. Appliances communication controller 104 also includes a signal transformer 225 and line protector 230, a PLC transceiver 235 and a PLC signal processing and encoding unit 240, sometimes referred to herein as a PLC signal processor. In an exemplary embodiment, appliances communication controller 104 also includes a program memory 250, a data memory 255, and a clock generator 260. Connections 265 of appliances communication controller 104 facilitate connection to appliance 102 (shown in FIG. 1), and in an exemplary embodiment one of connections 265 is a serial signal (COMM) connection and the other connection 265 is a signal ground (SGND) connection.

Transformer 215 may be implemented as a power transformer such as those commercially available from Signal Transformer Co. of Inwood, N.Y. and Tamura Corporation of America in Temecula, Calif. Rectifier, filter and regulator 220 may be implemented in one embodiment with diodes commercially available from Texas Instruments Inc. of Dallas, Tex. or General Semiconductor, Inc.; Panasonic capacitors or Rubicon film capacitors, and a regulator commercially available from Toshiba America Electronic Components of Irvine, Calif. or Micrel Semiconductor of San Jose Calif.

Signal transformer 225 in one embodiment is commercially available from Signal Transformer Co. of Inwood, N.Y. or Vacuumschmelze GMBH & Co. of Hanau, Germany. Line protector 230 in a particular embodiment is a gas tube such as those manufactured by Siemens Corporation of New York, N.Y. PLC transceiver 235 and signal processor 240 may be implemented using PLC integrated circuits manufactured by Royal Philips Electronics of Amsterdam, the Netherlands or the aforementioned IT800 Power Line Carrier Transceiver available from Itran Communications, Ltd of Naples, Fla. In a further exemplary embodiment, communication processor 245 may be implemented as a commercially available microcontroller such as the Hitachi H8S/2134 available from Hitachi Semiconductor (America) Inc. of San Jose, Calif.

Of course, it is understood that the foregoing components are but one collection of components that could be used to implement appliances communication controller 104, and that other known and equivalent components may likewise be employed in alternative embodiments without departing from the scope of the present invention.

PLC connections 210 couple to an AC power line that provides a power line carrier channel. Transformer based power supply 217 includes power transformer 215 and a rectifier, filter and regulator 220 to provide logic level supplies for electronic signal processing and logic. Power supply 217 also electrically isolates electronic signal processing and logic from the AC power line. In alternative embodiments, galvanically isolated power switching supplies or low cost resistive or capacitive dropping power supplies, or low cost resistive or capacitive dropping power supplies may also provide electrical isolation, electronic signal processing and logic from the AC power line.

PLC connections 210 also couple to signal transformer 225, which facilitates a modulated carrier frequency signal from connections 210 to PLC transceiver 235. Line protector 230 electrically isolates the AC line from the rest of the system, and in a particular embodiment is located between signal transformer 225 and PLC transceiver 235. Transmission between PLC transceiver 235 and PLC signal processor 240 is generally bi-directional, but may be unidirectional in certain applications.

PLC signal processor 240 outputs to communication processor 245, which in an exemplary embodiment includes a general purpose universal asynchronous receiver transmitter (UART) that communicates with appliance 102 (shown in FIG. 1) through a communications channel connected through appliance connections 265. UART, in one embodiment, establishes serial bi-directional communication with the appliances communications channel, for example, by changing the transmitter to a high impedance state when not transmitting.

Communications processor 245 is coupled to program memory 250 that stores executable instructions for communications processor 245. Processor 245 is also coupled to data memory 255 that, for example, buffers messages. Program memory 250 and data memory 255 cooperate to buffer messages and to translate between a power line carrier communication protocol and an appliance protocol.

Inter-processor serial communications bus 112 (shown schematically in FIG. 1) is used to communicate between two or more circuit boards, microcontrollers or other devices distributed among one or more appliance platforms, such as between main control board 106 (shown in FIG. 1) and peripheral boards 108, 110 (shown in FIG. 1) and between appliance communication controller 104 and appliance main control board 106. Inter-processor serial communications bus 112 facilitates on demand communications in a multi-master environment. This communication standard does not imply, however, that more than two devices need be present to successfully communicate, nor does it limit a number of devices that can be placed on bus 112 beyond the limits set by the physical addressing scheme.

Because the system architecture has a level of asynchronous activity, the bus architecture is a multi-master environment. The multi-master arrangement allows any device in the system to request information or actions from any other device in the system at any time once they successfully attain control of bus 112 through arbitration.

In one embodiment, a collision detection scheme is employed to determine when a communications port is free or in use and when a collision has occurred on bus 112. A collision occurs when two or more masters attempt to use communications bus 112 at the same time. With respect to appliance communication controller 104, a collision can be detected because the transmit and receive ports on communications processor 245 are connected to the same bus wire Control of the interrupts associated with the communications port allows this to be an interrupt driven activity. Logically, this is a byte-oriented protocol. A higher level software protocol determines the length and content of packets comprising messages.

As will be seen, the serial bus communication protocol includes a physical layer, a data link layer, and an application layer. The physical layer determines an operational state of the bus system, the data link layer defines information communicated on the bus, and the application layer determines system response to communicated information on the bus. The following state table describes a physical layer of the protocol, explained further below.

TABLE 1

Physical Communication Protocol State Table

| State | Action | Result | Next State |
|---|---|---|---|
| 1 | Are there bytes to send? | Yes | 2 |
|   |   | No | 1 |
| 2 | Check bus activity | Busy | 6 |
|   |   | Free | 3 |
| 3 | Send Byte |   | 4 |
| 4 | Does byte sent = byte received? | Yes | 1 |
|   |   | No | 5 |
| 5 | Delay 3 to 8 byte times | Complete | 1 |
| 6 | Delay 5 byte times | Complete | 1 |

In delay states "5" and "6," a byte time is defined as the amount of time required to transmit a single byte on communications bus 112, which is dependent upon and determined by a communications baud rate, number of data bits, number of stop bits, and a parity bit, if used.

The variable delay period shown in state "5" is intended to make the restart delay time random. If a collision does occur, the two bus masters will not delay the same amount of time before retrying transmission, thereby reducing the possibility of subsequent collisions by the two masters. The variable delay period is determined by a known pseudo-random number process, or by a known circuit board function.

The data-link layer defines information moving across bus 112 in any given information packet. The bytes defined in the data-link layer do not necessarily have a one-to-one correlation with the bytes in the physical layer. Many physical devices, such as inter-IC Control ($I^2C$) devices, have bits in the physical layer that implement the functions of some of the bytes in the data-link layer. This data-link layer is intended to be generic so that an application layer of the software will not need to change even if the physical device is redesigned. This layer of the communication system is appropriate for such technologies as a Universal Asynchronous Receiver/Transmitter (UART) multi-drop environment.

The serial communications bus protocol is designed for use in a master/slave environment. However, rather than used with a designated master and several slaves, the protocol is implemented in a small network type of environment where a same device can be a master through one communication cycle and then become a slave for another communication cycle.

A command is used by a master device to request action from a slave. The command packet, in one embodiment, has the structure shown in the table below:

TABLE 2

Serial Bus Protocol Command Packet Structure

| STX | Address | Packet Length | Command | Data | CRC | ETX |
|---|---|---|---|---|---|---|
| 1 byte | 1 byte | 1 byte | 1 byte | N bytes | 2 bytes | 1 byte |

Specifically, Start-of-Text (STX) is one byte with a value of 0x02, and to determine whether an STX is valid, the receiving control board determines whether an Acknowledge (ACK) byte follows STX. If the value 0x02 is in the middle of a transmission and not followed by ACK, the value should not be interpreted as an STX.

Address is one byte and each device connected to bus 112 has one effective address.

Packet length is the number of bytes in the packet including STX, Address, Packet Length, Command, Data, Cyclic-Redundancy Check (CRC), and End-of-Text (ETX). The packet length value is equivalent to 7+n, where n is the number of data bytes.

Command or request is one byte defined by the application layer.

Data may be zero, one, or multiple bytes as defined in the application layer, except for the case of a request in which the first data byte will be the master's address so the slave will know which device to respond to.

CRC is a 16-bit Cyclic-Redundancy Check, and ETX (End-of-Text) is one byte with a value of 0x03.

For each command packet sent, the CRC is computed on all bytes of the packet except the STX, the CRC byte pair and the ETX.

An exemplary command sequence is set forth in the following table.

TABLE 3

Serial Bus Protocol Command Sequence
Command Sequence

| Master | | Slave | |
|---|---|---|---|
| STX | [0x02] | | |
| Slave Address | 1 byte | | |
| | | [0x06] | ACK |
| Packet Length | 1 byte | | |
| | | [0x06] | ACK |
| Command | 1 byte | | |
| | | [0x06] | ACK |
| Data Byte 1 | 1 byte | | |
| | | [0x06] | ACK |
| Data Byte 2 | 1 byte | | |
| | | [0x06] | ACK |
| Data Byte n | 1 byte | | |
| | | [0x06] | ACK |
| CRC MSB | 1 byte | | |
| | | [0x06] | ACK |
| CRC LSB | 1 byte | | |
| | | [0x06] | ACK |
| ETX | [0x03] | | |
| | | [0x06] | ACK |
| | | [0x06] | ACK |

An exemplary serial bus communications protocol is therefore set forth in the tables above, and the protocol is shown with all ACKs in the sequence. At any point in the process where an ACK can be sent a Not-Acknowledge (NAK) may be sent instead. If a NAK is transmitted, the communication sequence is aborted at that point. The master then has the option of re-starting the sequence, depending on the application. A NAK is transmitted only in response to an overrun or framing error detected on, or in lieu of, a received byte or in response to a received ETX when the computed packet CRC does not match the transmitted packet CRC. An additional ACK is sent at the end of each packet.

In one embodiment, an ACK is one byte with a value of 0x06, and a NAK is one byte with a value of 0x15. In alternative embodiments, different codes are employed to identify an ACK and a NAK, respectively.

Exemplary bus protocol request and response sequences are set forth in the following tables.

TABLE 4

Serial Bus Protocol Request Sequence
Request Sequence

| Requestor | | | Requestee |
|---|---|---|---|
| STX | [0x02] | | |
| Request Address | 1 byte | | |
| | | [0x06] | ACK |
| Packet Length | 1 byte | | |
| | | [0x06] | ACK |
| Request Command | 1 byte | | |
| | | [0x06] | ACK |
| Data Byte 1 Requestor's Address (Transmitter) | 1 byte | | |
| | | [0x06] | ACK |
| Data Byte 2 | 1 byte | | |
| | | [0x06] | ACK |
| Data Byte n | 1 byte | | |
| | | [0x06] | ACK |
| CRC MSB | 1 byte | | |
| | | [0x06] | ACK |
| CRC LSB | 1 byte | | |
| | | [0x06] | ACK |
| ETX | [0x03] | | |
| | | [0x06] | ACK |
| | | [0x06] | ACK |

TABLE 5

Serial Bus Protocol Response Sequence
Response to Request Sequence

| Requestee | | | Requestor |
|---|---|---|---|
| STX | [0x02] | | |
| Requestor's Address | 1 byte | | |
| | | [0x06] | ACK |
| Packet Length | 1 byte | | |
| | | [0x06] | ACK |
| Command to which Requestee is Responding | 1 byte | | |
| | | [0x06] | ACK |
| Data Byte 1 Requestee's Address (Transmitter) | 1 byte | | |
| | | [0x06] | ACK |
| Data Byte 2 | 1 byte | | |
| | | [0x06] | ACK |
| Data Byte n | 1 byte | | |
| | | [0x06] | ACK |
| CRC MSB | 1 byte | | |
| | | [0x06] | ACK |
| CRC LSB | 1 byte | | |
| | | [0x06] | ACK |
| ETX | [0x03] | | |
| | | [0x06] | ACK |
| | | [0x06] | ACK |

The exemplary protocol set forth above assumes that time increments with each row of the tables. Up to 250 milliseconds of delay is tolerated for any expected event (row); an ACK response to a transmitted byte, or the reception of the next byte of an incomplete packet. For the request sequence and response to request sequence, the first data byte is the transmitter's address.

By assigning a unique address to each device connected to bus 112, peripheral control boards 108, 110 (shown in FIG. 1) can communicate with one another within appliance 102 (shown in FIG. 1), appliance communication controller 104 can communication with appliance main controller 106.

For example, in one exemplary embodiment a device addressing scheme for a variety of devices for the serial bus protocol is set forth in the following table.

TABLE 6

Serial Bus Addressing Scheme

| Product/Board | Address |
|---|---|
| Reserved Addresses | 0x00 -0x0E |
| Refrigeration | |
| Fresh Food Temperature Board | 0x0F |
| Main Board | 0x10 |
| Human Machine Interface Board | 0x11 |
| Dispenser Board | 0x12 |
| Cooktop | |
| Main Board | 0x13 |
| Inductive Sensor Interface Chip | 0x14 |
| Factory Test Equipment (all products) | 0x15 |
| Service Equipment (all products) | 0x16 |
| Range Control | 0x17 |
| Clothes Care | |
| Washer Electronic Control | 0x20 |
| Washer Reserved | 0x21 |
| Washer Drive | 0x22 |
| Dryer Electronic Control | 0x23 |
| Debit Card Reader | 0x24 |
| Dishwasher | |
| Main Board | 0x30 |

In addition, in an exemplary embodiment, a version number request and a version number reply are incorporated into the protocol application layer, which is organized by printed wire assembly. Factory and service equipment can thus verify the version number and product type of each associated device for each appliance. A version number request command is shown below.

TABLE 7

Serial Bus Protocol Version Number Request Command

| Request Command | Value |
|---|---|
| Version Number Request | 0x01 |

The Version Number Request includes one data byte, which is the requestor's address. This enables the receiver to respond to the correct device. As will become evident below, this also enables appliance communication controller 104 to automatically detect the presence of appliance 102 and to configure itself accordingly for communication with appliance 102.

A Version Number Reply includes a number of data bytes not exceeding a predetermined maximum limit. In one embodiment, the Version Number Reply includes four data bytes. The first data byte is the requestee's address. The requester then knows which device is replying. The second data byte is the product identifier (specified in the product application layer). The next two data bytes are the encoded version number. In alternative embodiments, the Version Number Reply includes greater or fewer than four data bytes.

Thus, using the exemplary serial bus communications protocol set forth above, appliance main controller 106 can effectively communicate with peripheral boards 108, 110 and also with appliance communications controller 104. The foregoing protocol is but one implementation of an interprocessor communication scheme, and it is recognized that other bytes, codes, constants, addresses, and other parameter values may be used in alternative embodiments.

Figure 3:
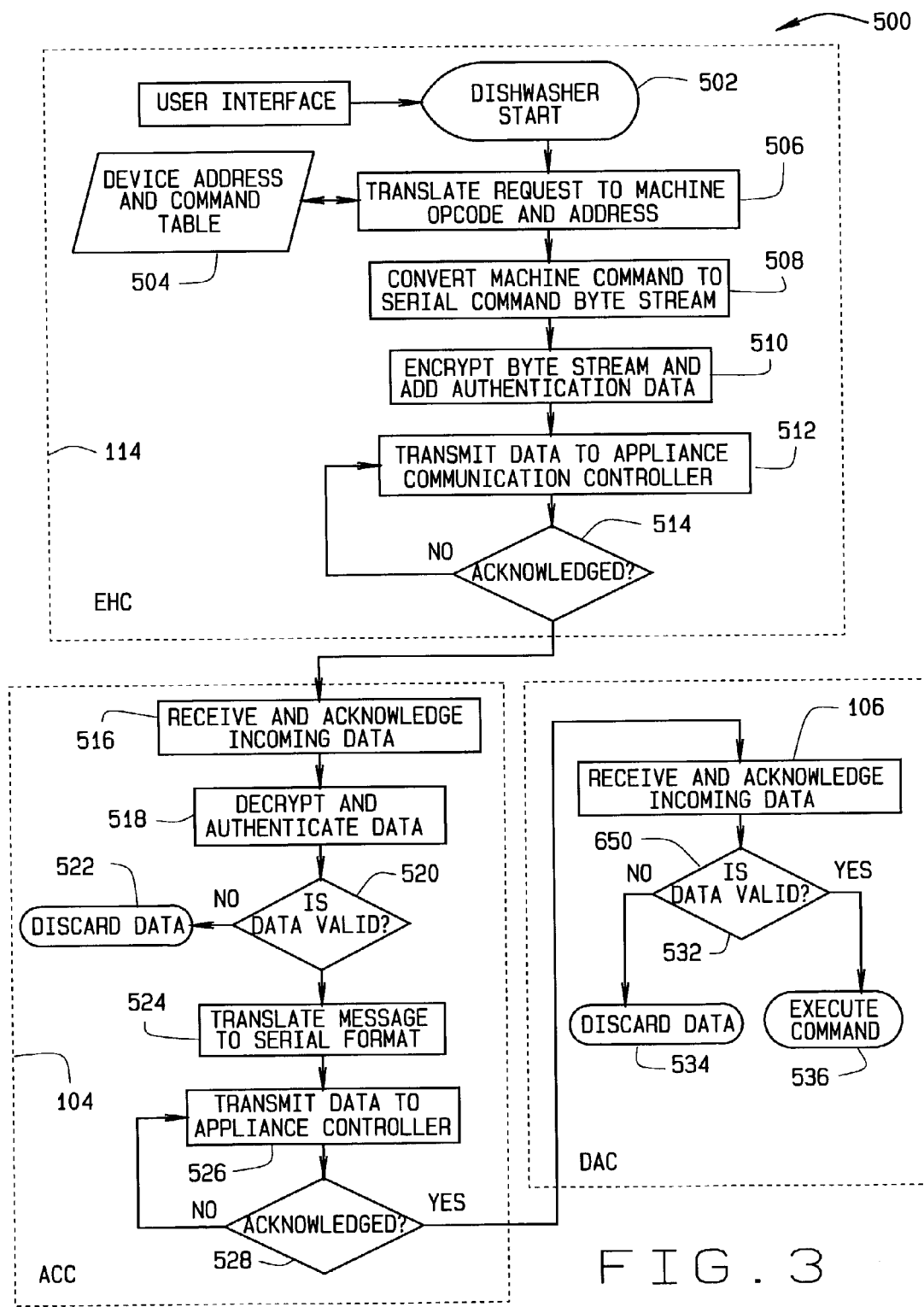
FIG. 3 is a method flow chart executable by the system shown in FIG. 1 for communicating between a power line carrier communication protocol and an appliance communication protocol.

FIG. 3 is a flow chart of a method 500 executable by appliance communications controller 104 (shown in FIGS. 1 and 2) and more specifically, communications processor 245, for translating between power line carrier communication protocol and the serial bus communication protocol (described above) for appliance 102. In an illustrative embodiment, a user runs an application on external host controller 114 (shown in FIG. 1) which has been developed to manipulate appliance 102. In an alternative embodiment, the user application is run on a remote system which has a communication link to external host controller 104. When the user selects 502 an appropriate command for appliance 102, such as Dishwasher START using external host controller 114, controller 114, through its application program, interprets the request and obtains the machine specific command from a device information table 504. Once the appropriate command has been obtained 506 from table 504, external host controller 114 generates 508 a message packet including the applicable machine command and device address. External host controller 114 further authenticates and encrypts 510 the data prior to transmission of the packet to appliance communication controller 104.

External host controller 114 converts the encrypted data to electrical signals and transmits 512 the electrical signals via carrier network 101 (shown in FIG. 1). External host controller 114 monitors transmission of the data packet to appliance communication controller 104 and checks 514 for an acknowledgment that the data has been received correctly by appliances communication controller 104. If the acknowledgment is not received in a specified time frame according to the serial bus communication protocol, the data will be retransmitted by external host controller 114.

Appliances communications controller 104 accepts and acknowledges the incoming data transmission from external host controller 114. Thus, appliance communication controller 104 converts 516 the received electrical signals back to a logical data packet. Appliance communication controller 104 employs selected algorithms to decrypt and authenticate 518 the received data packet. In circumstances where communication interface 120 is not able to authenticate 518 the data packet, or finds 520 the packet to be invalid, the data packet is discarded 522 and a request for retransmission is sent to external host controller through network carrier 101. Following a successful authentication of a data packet by appliance communication controller 104, appliance communication controller 104 will reformat 524 the data for serial transmission. The data is converted to electrical signals and transmitted 526 via bus 112 (shown in FIG. 1). Appliance communication controller 104 monitors 528 transmission of the data packet to appliance main controller 106 (shown in FIG. 1) and monitors for acknowledgement of the data being received correctly.

At the receiving end of the communication line, appliance control 106 converts the electrical signals from appliance communication controller 104 to logical information. Once appliance controller 104 accepts 530 the logical signals and confirms 532 the validity of the data, and acknowledgement is transmitted back to appliance communication controller 104 to complete the data exchange. Appliances controller 106 then interprets the data within the packet. If the packet contains a valid command then appliance controller 106 executes 534 the machine command accordingly. If the command is determined not to be valid then the request is discarded 536.

Using method 500 and the serial bus communications protocol, appliance 102 can be monitored and controlled from external host controller 114. Control parameters and algorithms may be updated or modified using external host controller 104, and appliance diagnostic functions may be executed.

Figure 4:
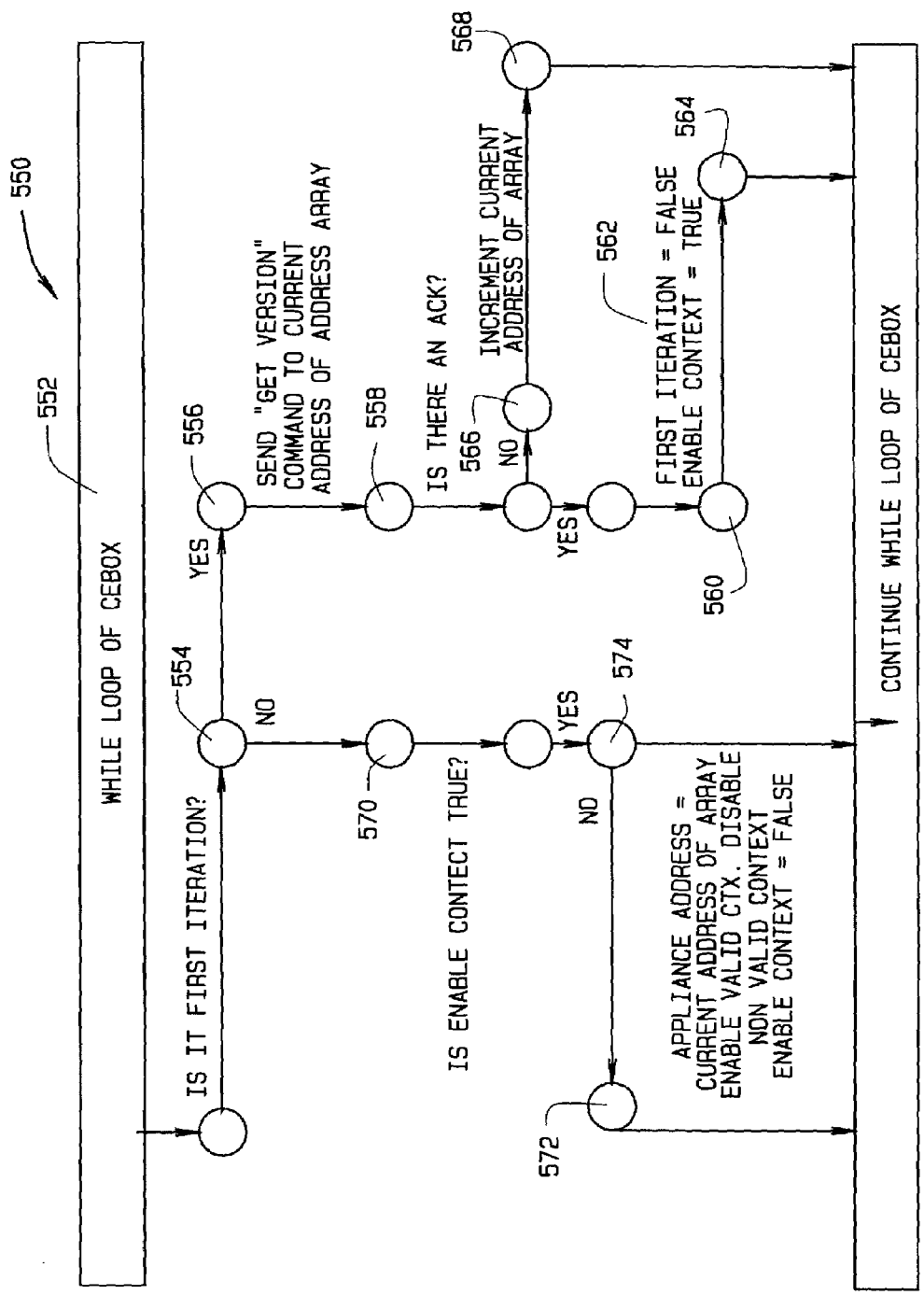
FIG. 4 is a method flow chart executable by the system shown in FIG. 1 for autodetection of appliance connections.

FIG. 4 is an exemplary flow chart of a method 550 executable by appliance communications controller 104 (shown in FIGS. 1 and 2 and described above) for autodetection of appliance connections. In an exemplary embodiment, method 550 is implemented using commercially available software, such as CEBox™ software commercially available from Domosys Corporation of Quebec City, Canada. It is understood, however, that the methodology described below could be implemented in various other software schemes familiar to and appreciated by those in the art.

Method 550 in an exemplary embodiment is embedded in a while loop 552 upon initialization of appliance communications controller 104. Thus, as appliance communication controller 104 powers up there is initialization of all potential appliance addresses supported by appliance communications controller 104. As appliance communications controller 104 initializes, a first iteration parameter or flag is set to "true" from the software main program and a current address value is set to the lowest address in the address scheme (e.g., 0x0F for the address scheme set forth in Table 6). Additionally, an enable context parameter is set to "false" from the software main program.

When while loop 552 is called, appliance communications controller 104 determines 554 the state of the first iteration flag. If the first iteration flag is "true" then appliance communications controller 104 sends 556 a version number request, described above, to the current address in the address array of the address scheme. After the version number request is sent, appliance communications controller 104 waits 558 for an acknowledgment from a device connected to the current address. If an acknowledgement is received 560, the first iteration flag is set 562 to "false" and an enable context flag in the software is set to "true." After setting the first iteration and enable context parameters in the software, the algorithm returns 564 to while loop 552.

If an acknowledgement of the version number request is not received 566 from the version number request that was sent 556 to the current address, the current address parameter in the software is incremented to the next address in the address array (e.g., the address is incremented from 0x0F to 0x10 for the exemplary address array set forth in Table 6). After incrementing the current address array in the software, the algorithm returns 568 to while loop 552.

After returning 564 or 568 to while loop 552, appliance communications controller 104 again determines 554 a state of the first iteration parameter. If the first iteration parameter is set to "false" then appliance communications controller 104 determines 570 a state of the enable context parameter. If the enable context parameter is "false" the algorithm returns 572 to while loop 552.

If appliance communications controller 104 determines 570 that the enable context parameter is "true" then the current address of the array is set 574 as a connected appliance address for valid communication between appliance communications controller 104 and the connected appliance device, such as a device associated with appliance 102 (shown in FIG. 1). After the current address is set 574 for valid communication, the algorithm returns to while loop 552. As the algorithm returns, in the exemplary embodiment the enable context parameter is reset to "false."

In a further embodiment, the first iteration parameter is also reset to "true" when the current address is set 574 for valid communication, and the current address parameter is incremented to the next potential address in the address array for a possible connected appliance or device. In such an embodiment, appliance communications controller 104 will again determine 554 a state of the first iteration parameter and repeat method 550 by sending 556 a version number address to the next address. Thus, more than one connected appliance or device may be automatically detected by appliance communications controller 104.

In still a further embodiment, if no acknowledgement of the version number request is received 560 after a version number request is sent 558 to all of the available addresses, the algorithm continues with the first available address and proceeds until an acknowledgment is received.

It should now be evident that method 550 ensures that as soon as appliance communication controller 104 is connected to a powered appliance, such as appliance 102 (shown in FIG. 1), upon power up the appliance communications controller 104 will automatically detect the presence of one or more connected appliances or devices and commence valid communication with the connected appliances or devices. Meaningful data exchange between appliance communications controller 104 and a variety of appliance platforms and different devices is therefore facilitated. Custom communication controllers for particular devices and appliances is therefore avoided, together with associated costs and expense.

It is believed that those in the art of electronic controllers could program appliance communications controller 104 to execute method 550 without further explanation.

While the invention has been described in terms of various specific embodiments, those skilled in the art will recognize that the invention can be practiced with modification within the spirit and scope of the claims.

What is claimed is:

1. A method for communicating a communications controller with a connected device over a serial bus, said method comprising:
    connecting the device to the bus at one of a plurality of addresses;
    sending a first request to the device over the bus at a first address, wherein the first request relates to a predetermined type of device;
    waiting for an acknowledgement of the first request by the device; and
    establishing communication with the connected device at the first address if the acknowledgement of the first request received; and
    if communication with the connected device is not established at the first address, sending a second request to a second address over the bus, wherein the second request relates to a predetermined type of device that is different than the type of device relating to the first request.

2. A method in accordance with claim 1 further comprising:
    waiting for an acknowledgement of the second request by the device; and
    sending a third request to a third address over the bus if the acknowledgment of the second request is not received, wherein the third request relates to a predetermined type of device that is different than the types of devices relating to the first and second requests.

3. A method in accordance with claim 1 wherein said sending a first request to the device comprises sending a version number request.

4. A method for communicating an appliance communications controller with at least one connected device over a serial communications link, said method comprising:
    connecting the device to the link at one of a plurality of device addresses according to a communications protocol;
    sending a first request to the device over a current one of the plurality of addresses of the communications protocol, wherein the first request relates to a predetermined type of device;
    waiting for an acknowledgement of the sent request by the device;
    establishing communication with the device at the current address if the acknowledgement of the sent request is received; and
    if the acknowledgment is not received, selecting a new current address in communications protocol and sending a second request to the device at the new current address, wherein the second request relates to a predetermined type of device that is different than the type of device relating to the first request.

5. A method in accordance with claim 4 wherein sending a request comprises sending a version number request.

6. A method in accordance with claim 4 further comprising repeating the step of selecting a new current address in communications protocol and sending a request to the device at the new current address until an acknowledgment is received.

7. A method in accordance with claim 4, the communications controller connected to an external host computer through a network carrier, said method further comprising:
    sending a communication from the external host computer to the appliance communications controller through the network carrier; and
    transmitting the communication from the external host computer to the connected device through the appliance communications controller at the address where the request was acknowledged.

8. A method for communicating an appliance communications controller with at least one device connected to the communications controller over a serial communications link distributed within an appliance, appliance controller including a memory having a plurality of predetermined device addresses therein, said method comprising:
    connecting the device to the serial communications link at one of the plurality of predetermined device addresses according to a communications protocol;
    repeatedly sending a request to the device over successive addresses of the communications protocol, which comprises:

sending a first request relating to a predetermined type of device; and sending a second request relating to a predetermined type of device that is different than the type of device relating to the first request;

waiting for an acknowledgement of the sent request by the device after sending each of said repeated requests; and when any of the requests are acknowledged by the connected device, establishing communication with the device at the address where the acknowledgement is received.

9. A method in accordance with claim 8 wherein said sending a request to the device comprises sending a version number request.

10. An appliance communications controller comprising:
a processor configured for connection to an external device; and
a memory coupled to said processor, said memory comprising a plurality of addresses for communication with the external device, said processor configured to send a first request to a first address of said addresses, the first request relating to a predetermined type of device, send a second request to a second address of said addresses, the second request relating to a predetermined type of device that is different than the type of device relating to the first request, and determine which of said addresses are associated with the external device and to communicate with the external device at the address associated with the external device.

11. An appliance communication controller in accordance with claim 10 wherein said processor is configured for connection to a network carrier.

12. An appliance communication controller in accordance with claim 10 wherein said appliance communication controller comprises a power line carrier transceiver.

13. An appliance communications controller for establishing communication to an external device over a network carrier, said communications controller comprising:
a power line carrier transceiver;
a processor coupled to said power line carrier receiver; and
a memory coupled to said processor, said processor programmed to:
select one of a plurality of addresses for communication with the external device from said memory;
send a first request to the selected address, wherein the first request relates to a predetermined type of external device;
if an acknowledgment of the first request is received, to communicate with the external device in accordance with a predetermined communications protocol; and
if the acknowledgment is not received, to send a second request to a new address, wherein the second request relates to a predetermined type of external device that is different than the type of external device relating to the first request.

14. An appliance communications controller in accordance with claim 13 wherein said controller is further programmed to select another of the plurality of addresses for communication with the external device from said memory if an acknowledgement is not received and send another request to said another of said addresses.

15. An appliance communications control system comprising:
at least one appliance comprising a distributed serial communications link and at least one device connected thereto, said device configured to send and receive data communications; and
a communications controller operatively coupled to said serial communications link and configured to send and receive data communications with said device according to a communications protocol, said communications controller comprising:
a network carrier transceiver;
a processor coupled to said network carrier transceiver; and
a memory coupled to said processor and, comprising address information associated with connection of the at least one appliance device, said processor programmed to detect connection of said at least one appliance device by successively sending a communications request to each of a plurality of addresses supported by said memory and accepting a reply by the at least one communication device when a communications request is sent to the address where said at least one device is connected, wherein said processor further programmed to send a first communications request relating to a predetermined type of appliance, and to send a second communications request relating to a predetermined type of appliance that is different than the type of appliance relating to the first communications request.

16. A system in accordance with claim 15 wherein said network carrier transceiver comprises a power line carrier transceiver.

17. A system in accordance with claim 15 wherein said data communications comprises a physical layer, a data link layer and an application layer.

* * * * *